US00RE35149E

United States Patent [19]

Richardson et al.

[11] E Patent Number: Re. 35,149

[45] **Reissued Date of Patent: * Jan. 30, 1996**

[54] RAILLESS REFRIGERATOR DISPLAY DOOR

[75] Inventors: Richard J. Richardson, Simi Valley; Bennie R. Downing, Thousand Oaks, both of Calif.

[73] Assignee: Anthony's Manufacturing Company, Inc., San Fernando, Calif.

[ * ] Notice: The portion of the term of this patent subsequent to Mar. 24, 2009, has been disclaimed.

[21] Appl. No.: 246,356

[22] Filed: May 19, 1994

Related U.S. Patent Documents

Reissue of:

[64] Patent No.: 5,113,628
Issued: May 19, 1992
Appl. No.: 644,072
Filed: Jan. 18, 1991

U.S. Applications:

[63] Continuation-in-part of Ser. No. 585,602, Sep. 20, 1990, Pat. No. 5,097,642.

[51] Int. Cl.[6] ..... E04B 1/74

[52] U.S. Cl. ..... 52/204.593; 52/172; 52/786.13; 49/501

[58] Field of Search ..... 52/171, 475, 790, 52/788, 789, 172; 49/501, 504

[56] References Cited

U.S. PATENT DOCUMENTS

| | | |
|---|---|---|
| 834,968 | 11/1906 | Christenson . |
| 1,117,340 | 11/1914 | Crittall . |
| 1,636,593 | 7/1927 | Dennis . |
| 1,805,969 | 5/1931 | Bostrom . |
| 1,877,336 | 9/1932 | Lovell et al. . |
| 1,975,895 | 10/1934 | Geyer . |
| 2,173,649 | 9/1939 | Firner . |
| 2,173,664 | 9/1939 | Shutts . |
| 2,205,522 | 6/1940 | Fix . |
| 2,282,831 | 5/1942 | Shutts . |
| 2,348,307 | 5/1944 | Richardson . |
| 2,383,691 | 8/1945 | Smith . |
| 2,489,962 | 11/1949 | Hardwick . |
| 2,589,064 | 3/1952 | Drake . |
| 2,607,086 | 8/1952 | Saunders . |
| 2,679,074 | 5/1954 | Bryden . |
| 2,708,774 | 5/1955 | Seelen . |
| 2,774,117 | 12/1956 | Eckel . |
| 2,834,999 | 5/1958 | Taylor et al. . |
| 2,872,713 | 2/1959 | Haas . |
| 2,873,486 | 2/1959 | Hughes . |
| 2,877,516 | 3/1959 | Bobel . |
| 2,877,761 | 3/1959 | Schibley . |

(List continued on next page.)

FOREIGN PATENT DOCUMENTS

| | | |
|---|---|---|
| 0018468 | 11/1980 | European Pat. Off. . |
| 0019020 | 11/1980 | European Pat. Off. . |
| 0041840 | 3/1984 | European Pat. Off. . |
| 0082164 | 9/1984 | European Pat. Off. . |
| 0124749 | 11/1984 | European Pat. Off. . |
| 0124397 | 11/1984 | European Pat. Off. . |

(List continued on next page.)

OTHER PUBLICATIONS

"Structural Spacer Glazing", by C. Gregory Carney, Glass Magazine, Mar. 1988; pp. 173–175.

*Primary Examiner*—Wynn E. Wood
*Attorney, Agent, or Firm*—Poms, Smith, Lande & Rose

[57] ABSTRACT

A railless refrigerator display door constructed with two or more glass panels and having a peripheral door frame extending around the sides of The door and at the inside of the door without covering the outside glass surface of the door. Sealant is used to bond the glass panels to peripheral spacers separating the panels and to C-section structures which extend peripherally around the sides of the door. The door frame is also bonded to the C-section structures and glass panels by the sealant. Rubber bumpers attached to the C-section structures reduce heat transfer from the inside glass panel to the outside glass panel. As such, mechanical fasteners such as nuts, bolts or screws are not needed for the purpose of holding the refrigerator door together.

64 Claims, 4 Drawing Sheets

U.S. PATENT DOCUMENTS

| | | | |
|---|---|---|---|
| 2,880,475 | 4/1959 | Mills . | |
| 2,904,819 | 9/1959 | Seaman . | |
| 2,909,814 | 10/1959 | Schwartz . | |
| 2,975,492 | 3/1961 | Persson . | |
| 2,987,782 | 6/1961 | Kurowski . | |
| 3,024,880 | 3/1962 | Burmeister . | |
| 3,030,673 | 4/1962 | London . | |
| 3,054,153 | 9/1962 | Partsch . | |
| 3,077,643 | 2/1963 | Horner . | |
| 3,170,456 | 2/1965 | Moss et al. . | |
| 3,280,523 | 10/1966 | Stroud et al. . | |
| 3,300,900 | 1/1967 | Risk et al. . | |
| 3,331,159 | 7/1967 | Cooke et al. . | |
| 3,335,785 | 8/1967 | Anderson et al. . | |
| 3,339,225 | 9/1967 | Booth . | |
| 3,396,490 | 8/1968 | Dukas . | |
| 3,411,247 | 11/1968 | Fleming . | |
| 3,418,779 | 12/1968 | Jendrisak et al. . | |
| 3,425,163 | 2/1969 | Horgan, Jr. . | |
| 3,442,059 | 5/1969 | Kessler . | |
| 3,499,245 | 3/1970 | Winsler et al. . | |
| 3,577,973 | 5/1971 | Katona . | |
| 3,629,972 | 12/1971 | Rehberg et al. . | |
| 3,662,429 | 5/1972 | Johnson et al. . | |
| 3,667,179 | 6/1972 | Eisenberg . | |
| 3,855,995 | 12/1974 | Bentley . | |
| 3,875,706 | 4/1975 | Okawa . | |
| 3,889,434 | 6/1975 | Shelver . | |
| 3,919,023 | 11/1975 | Bowser et al. . | |
| 3,919,821 | 11/1975 | Goetz . | |
| 3,949,526 | 4/1976 | Sherlock et al. . | |
| 3,965,638 | 6/1976 | Newman . | |
| 3,971,178 | 7/1976 | Mazzoni et al. | 52/172 |
| 3,975,881 | 8/1976 | Ninowski, Jr. . | |
| 4,015,394 | 4/1977 | Kessler . | |
| 4,030,263 | 6/1977 | Lacombe . | |
| 4,042,736 | 8/1977 | Flint . | |
| 4,043,091 | 8/1977 | Katona . | |
| 4,055,031 | 10/1977 | Okawa et al. . | |
| 4,084,347 | 4/1978 | Brown . | |
| 4,097,320 | 6/1978 | Brauer et al. . | |
| 4,109,432 | 8/1978 | Pilz . | |
| 4,138,284 | 2/1979 | Postupack . | |
| 4,143,493 | 3/1979 | Booi . | |
| 4,145,844 | 3/1979 | Kaspar . | |
| 4,149,348 | 4/1979 | Pyzewski | 52/172 |
| 4,155,205 | 5/1979 | Polman . | |
| 4,205,486 | 6/1980 | Guarnacci . | |
| 4,223,482 | 9/1980 | Barroero et al. . | |
| 4,226,063 | 10/1980 | Chenel . | |
| 4,295,305 | 10/1981 | Shelver . | |
| 4,348,435 | 9/1982 | Mistrick et al. . | |
| 4,368,226 | 1/1983 | Mucaria . | |
| 4,382,177 | 5/1983 | Heaney . | |
| 4,393,105 | 7/1983 | Kreisman . | |
| 4,412,708 | 11/1983 | Palka . | |
| 4,416,101 | 11/1983 | Derner et al. . | |
| 4,429,509 | 2/1984 | Vachet et al. . | |
| 4,454,703 | 6/1984 | Sitzler et al. . | |
| 4,459,789 | 7/1984 | Ford . | |
| 4,514,948 | 5/1985 | Meigs et al. . | |
| 4,552,790 | 11/1985 | Francis . | |
| 4,588,235 | 5/1986 | Barroero . | |
| 4,604,840 | 8/1986 | Mondon . | |
| 4,622,249 | 11/1986 | Bowser . | |
| 4,637,167 | 1/1987 | Svensson . | |
| 4,640,078 | 2/1987 | Haffer . | |
| 4,658,553 | 4/1987 | Shinagawa . | |
| 4,671,582 | 6/1987 | Stromquist et al. . | |
| 4,691,486 | 9/1987 | Niekrasz et al. . | |
| 4,696,078 | 9/1987 | Stromquist . | |
| 4,719,728 | 1/1988 | Eriksson et al. | 52/172 |
| 4,741,127 | 5/1988 | Bockwinkel | 49/501 |
| 4,753,043 | 6/1988 | Bockwinkel | 49/501 |
| 4,807,419 | 2/1989 | Hodek et al. . | |
| 4,817,335 | 4/1989 | Adell . | |
| 4,818,043 | 4/1989 | Borgen . | |
| 4,822,649 | 4/1989 | Canaud et al. . | |
| 4,825,609 | 5/1989 | Rundo . | |
| 4,831,780 | 5/1989 | Bockwinkel . | |
| 4,850,168 | 7/1989 | Thorn | 49/501 |
| 4,852,303 | 8/1989 | Rolek . | |
| 4,873,803 | 10/1989 | Rundo . | |
| 4,890,438 | 1/1990 | Tosa et al. . | |
| 4,940,297 | 7/1990 | Borgen . | |
| 4,948,206 | 8/1990 | Fitzpatrick . | |
| 4,950,344 | 8/1990 | Glover et al. . | |
| 4,961,975 | 10/1990 | Bejnar . | |
| 4,994,309 | 2/1991 | Reichert et al. . | |
| 4,998,382 | 3/1991 | Kostos et al. . | |
| 5,024,023 | 6/1991 | Kostos et al. . | |
| 5,111,618 | 5/1992 | Kasper et al. | 49/504 |

FOREIGN PATENT DOCUMENTS

| | | |
|---|---|---|
| 0138782 | 4/1985 | European Pat. Off. . |
| 0162344 | 11/1985 | European Pat. Off. . |
| 0163166 | 12/1985 | European Pat. Off. . |
| 0168672 | 1/1986 | European Pat. Off. . |
| 0176091 | 4/1986 | European Pat. Off. . |
| 0108677 | 7/1986 | European Pat. Off. . |
| 0213970 | 3/1987 | European Pat. Off. . |
| 228641 | 7/1987 | European Pat. Off. . |
| 0231676 | 8/1987 | European Pat. Off. . |
| 0249299 | 12/1987 | European Pat. Off. . |
| 0264002 | 4/1988 | European Pat. Off. . |
| 0264052 | 4/1988 | European Pat. Off. . |
| 0269470 | 6/1988 | European Pat. Off. . |
| 0288060 | 10/1988 | European Pat. Off. . |
| 0303330 | 2/1989 | European Pat. Off. . |
| 0313892 | 5/1989 | European Pat. Off. . |
| 0319695 | 6/1989 | European Pat. Off. . |
| 0351573 | 1/1990 | European Pat. Off. . |
| 0387204 | 9/1990 | European Pat. Off. . |
| 0388550 | 9/1990 | European Pat. Off. . |
| 0418461 | 3/1991 | European Pat. Off. . |
| 0432872 | 6/1991 | European Pat. Off. . |
| 2908541 | 3/1979 | Germany . |
| 2840656 | 3/1980 | Germany . |
| 3543524 | 6/1987 | Germany . |
| 1032616 | 6/1979 | Italy . |
| 1084120 | 5/1985 | Italy . |
| 1091235 | 7/1985 | Italy . |
| 1165175 | 4/1987 | Italy . |
| 1208888 | 7/1989 | Italy . |
| 1216012 | 2/1990 | Italy . |
| 7604769 | 3/1977 | Sweden . |
| 503878 | 2/1969 | Switzerland . |
| 1301651 | 1/1973 | United Kingdom . |
| 1398434 | 6/1975 | United Kingdom . |
| 1482372 | 8/1977 | United Kingdom . |
| 2023209 | 12/1979 | United Kingdom . |
| 1579838 | 11/1980 | United Kingdom . |
| 1581946 | 12/1980 | United Kingdom . |
| 2075435 | 11/1981 | United Kingdom . |
| 8400191 | 1/1984 | WIPO . |
| WO8807617 | 10/1988 | WIPO . |

Fig. 4.
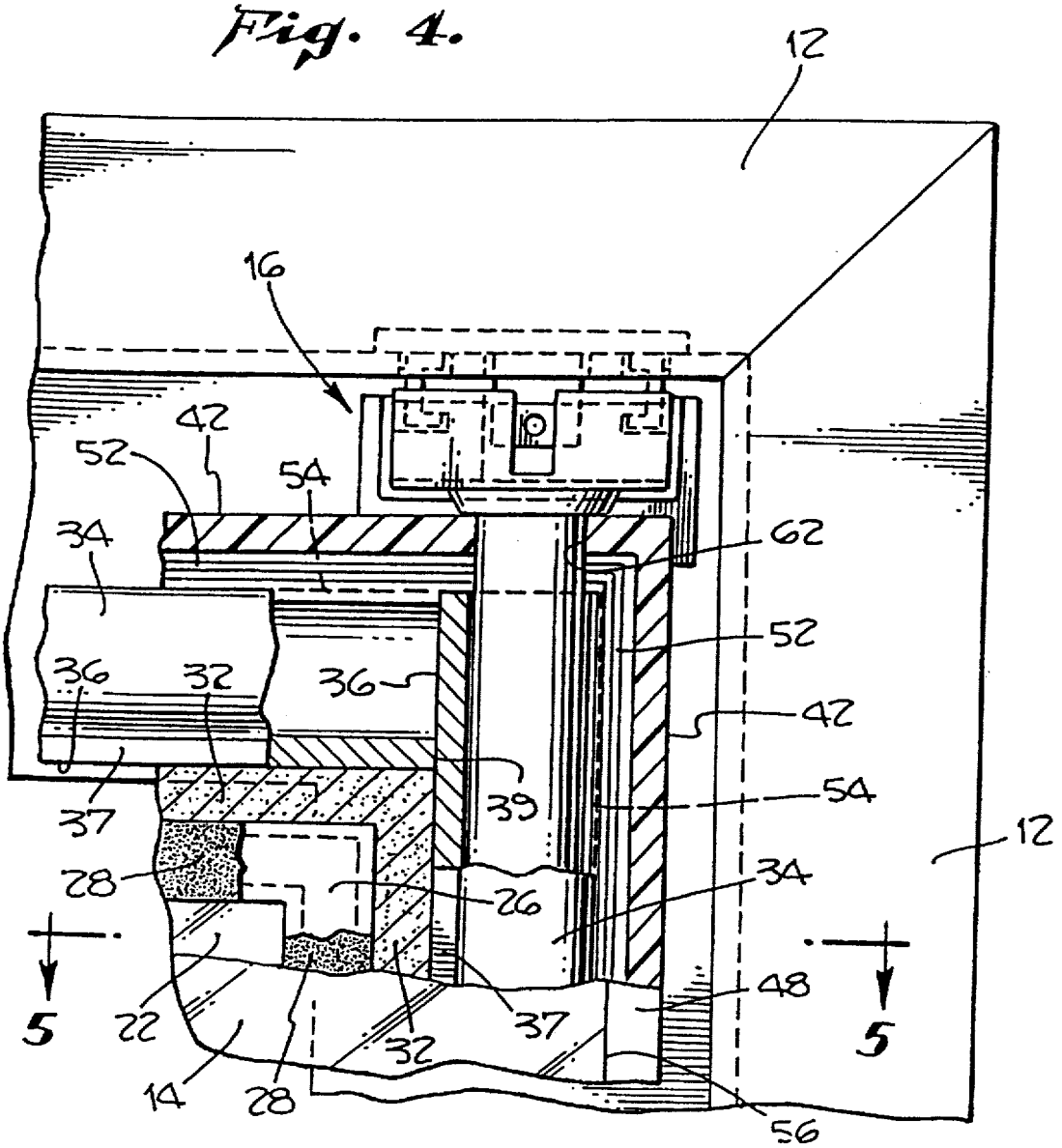
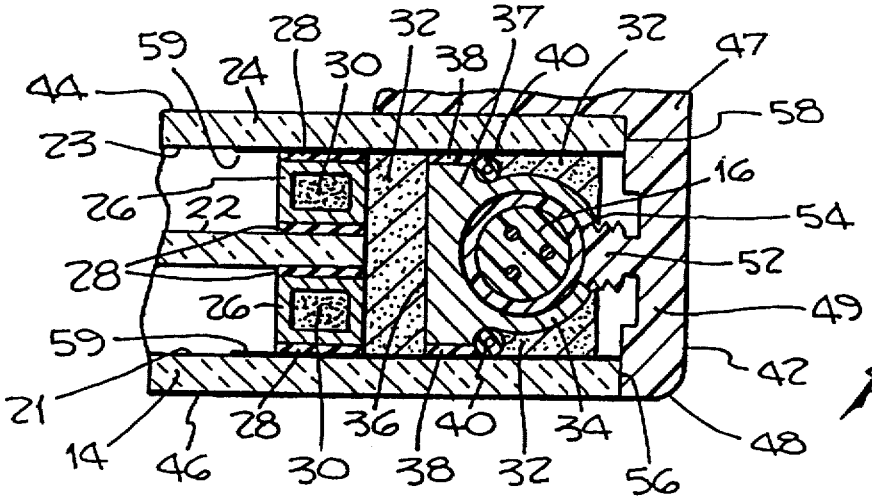
Fig. 5.

RAILLESS REFRIGERATOR DISPLAY DOOR

Matter enclosed in heavy brackets [ ] appears in the original patent but forms no part of this reissue specification; matter printed in italics indicates the additions made by reissue.

CROSS-REFERENCE TO RELATED APPLICATION

This application is a continuation-in-part of application, Ser. No. 07/585,602, filed Sep. 20, 1990, *now U.S. Pat. No. 5,097,642,* and entitled "Glass Refrigerator Door Structure."

BACKGROUND OF THE INVENTION

The present invention relates generally to refrigerator doors, and more particularly to a railless refrigerator display door constructed with two or more glass panels and having a peripheral door frame extending around the sides of the door and at the inside of the door without covering the outside glass surface of the door.

Present commercial glass refrigerator doors typically have door frames which extend peripherally around the glass panels of the doors. Such door frames are used to hold the glass panels in place and extend peripherally around both the inside and outside glass surfaces of the doors. As a result, the door frames can be seen from the outside of the doors, distracting from the appearance of the glass doors. Such door frames are disclosed, for example, in U.S. Pat. Nos. 4,696,078, issued to Stromquist on Sep. 29, 1987; 4,671,582, issued to Stromquist, et al. on Jun. 9, 1987; 4,223,482, issued to Barroero, et al. on Sep. 23, 1980; 3,339,225, issued to Booth on Sep. 5 1967; and 3,331,159, issued to Cooke, et al. on Jul. 18, 1967.

SUMMARY OF THE INVENTION

It is an object of this invention to provide a railless refrigerator display door having a peripheral door frame that does not cover the outside glass surface of the door, presenting a more attractive and desirable refrigerator door.

It is another object of this invention to provide a railless refrigerator display door that is simple in design and inexpensive to manufacture.

It is still another object of this invention to provide a railless refrigerator display door which may be constructed with two or more glass panels.

It is still another object of this invention to provide a railless refrigerator display door which does not require mechanical fasteners such as nuts, bolts or screws to hold the structure together.

These and other objects and advantages are attained by a railless refrigerator display door constructed with two or more glass panels. The refrigerator door has a peripheral door frame extending around the sides of the door and at the inside of the door without covering the outside glass surface of the door. Sealant is used to bond the glass panels to peripheral spacers separating the panels and to C-section structures which extend peripherally around the sides of the door. The door frame is also bonded to the C-section structures and glass panels by the sealant. Rubber bumpers attached to the C-section structures reduce heat transfer from the inside glass panel to the outside glass panel. As such, mechanical fasteners such as nuts, bolts or screws are not needed for the purpose of holding the refrigerator door together.

The various features of the present invention will be best understood together with further objects and advantages by reference to the following description of the preferred embodiments taken in conjunction with the accompanying drawings.

BRIEF DESCRIPTION OF THE DRAWINGS:

FIG. 4 is a detailed cross-sectional view taken in the direction of arrows 4—4 shown in FIG. 2;

FIG. 5 is a detailed cross-sectional view taken in the direction of arrows 5—5 shown in FIG. 4 illustrating how three glass panels may be used for the railless refrigerator display door;

DESCRIPTION OF THE PREFERRED EMBODIMENTS:

The following specification taken in conjunction with the drawings sets forth the preferred embodiments of the present invention in such a manner that any person skilled in the art can make and use the invention. The embodiments of the invention disclosed herein are the best modes contemplated by the inventors for carrying out their invention in a commercial environment, although it should be understood that various modifications can be accomplished within the parameters of the present invention.

Figure 1:
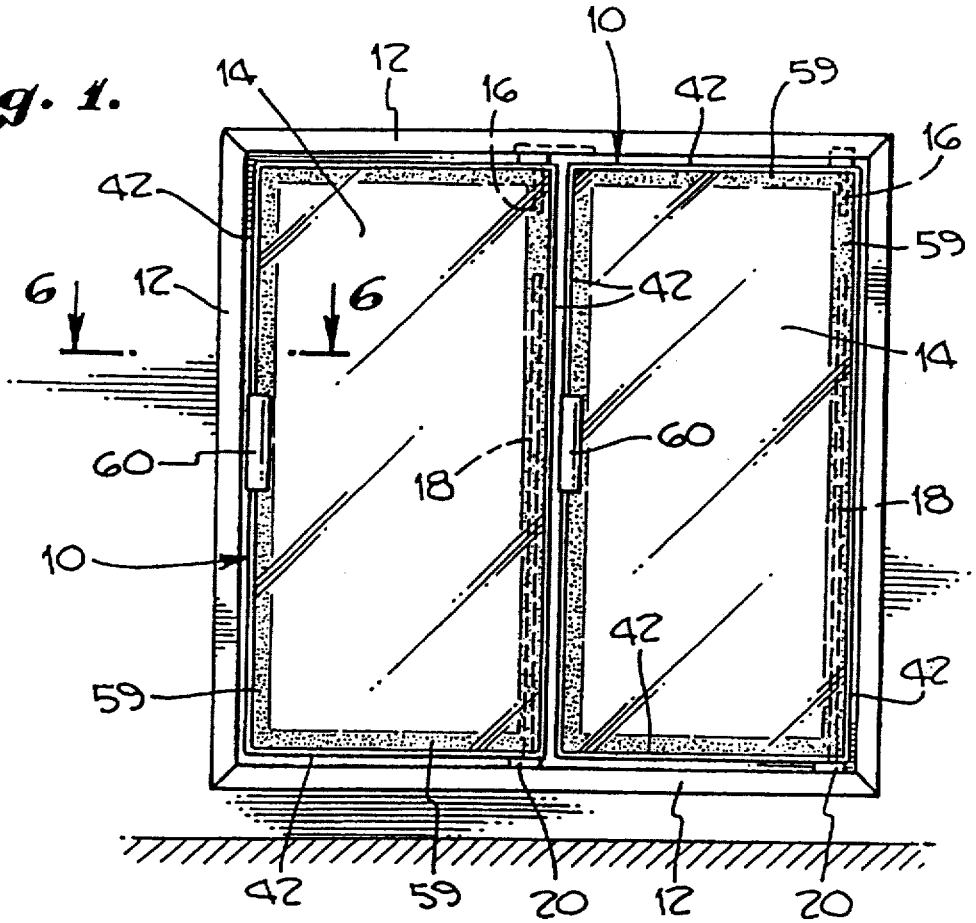
FIG. 1 is an elevational view of two railless refrigerator display doors of the present invention mounted on a cabinet or other supporting structure.

Referring to FIG. 1, two railless refrigerator display doors 10 of the present invention are shown installed or mounted on a cabinet or other supporting structure 12. The refrigerator display doors 10 have glass panels 14 which allow someone, such as a customer in a supermarket, to look through the panels 14 at frozen foods or other items kept inside a refrigerated area. However, it is important to note that the display door 10 of the present invention may be used as doors for any enclosed area whether or not the area is refrigerated.

A door hinge assembly 16 may be used at the upper right-hand corner of each railless refrigerator display door 10 and a torque rod 18 may be mounted in an adjustable anchor device 20 attached to the supporting structure 12 near the lower right-hand corner of the door 10.

Figure 2:
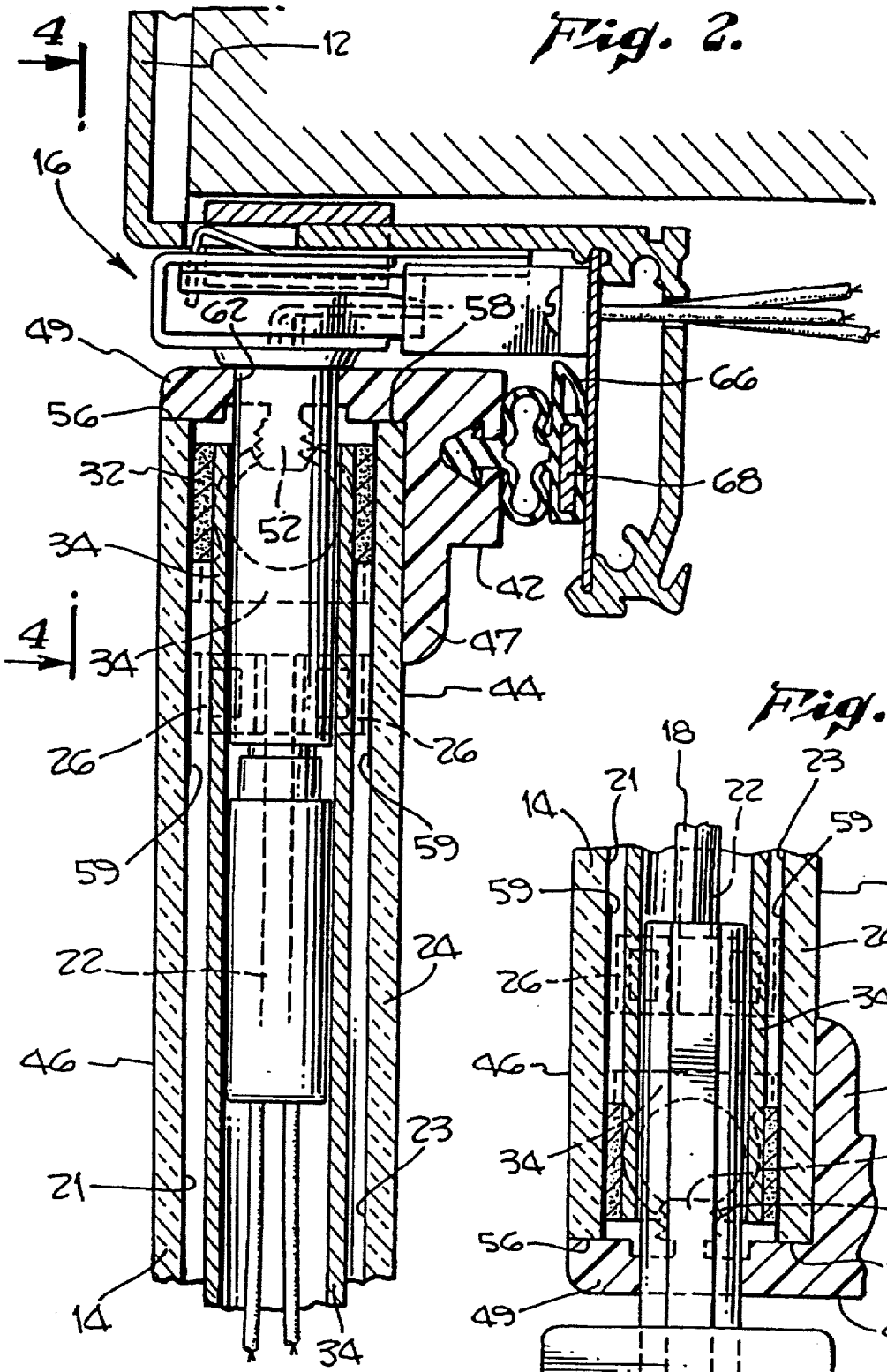
FIG. 2 is a detailed cross-sectional view showing how a door hinge assembly may be used at the upper right-hand corner of each railless refrigerator display door.

One such door hinge assembly 16 is shown in detail in FIGS. 2 and 4. This hinge assembly 16 is described in U.S. Pat. No. 4,671,582, issued to Stromquist, et al. on Jun. 9, 1987, the disclosure of which is hereby incorporated by reference thereto. However, any other suitable type of hinge assembly may be used instead of the hinge assembly 16 shown in FIGS. 2 and 4.

Figure 3:
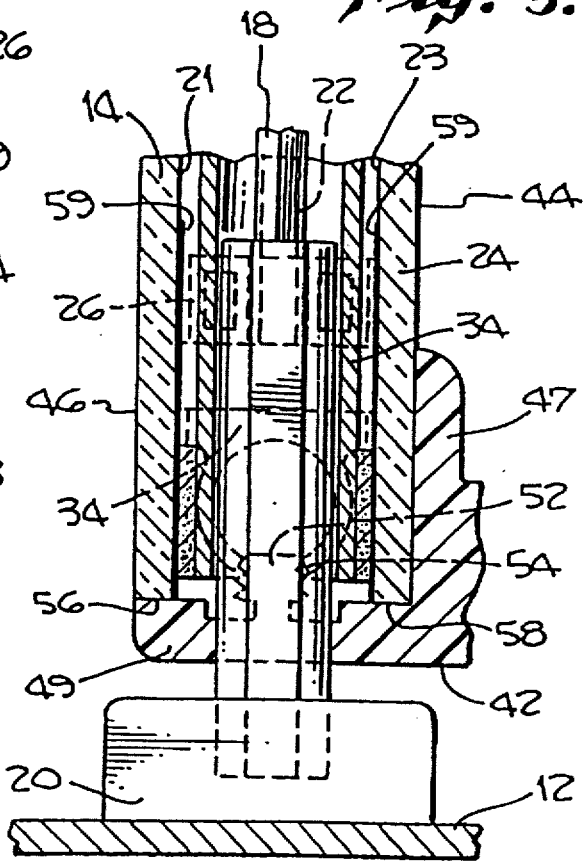
FIG. 3 is a detailed cross-sectional view showing how a torque rod may be used with an adjustable anchor device at the lower right-hand corner of each railless refrigerator display door.

FIG. 3 shows how the torque rod 18 may be mounted in an adjustable anchor device 20 at the lower right-hand corner of each refrigerator display door 10. A torque rod 18 and an adjustable anchor device 20, which may be used with door 10, are described in U.S. Pat. No. 4,696,078, issued to Stromquist on Sep. 29, 1987, the disclosure of which is hereby incorporated by reference thereto. It is important to note that any other suitable types of torque rods or anchor devices may also be used. For example, the torque rod 18 may be mounted in an aperture in the supporting structure 12.

Referring now to FIGS. 4 and 5, an embodiment of the railless refrigerator display door 10 is shown which uses outside, middle and inside glass panels 14, 22 and 24, respectively. The panels are spaced apart by two hollow spacers 26, preferably made of metal such as aluminum. However, any desirable material may be used for the spacers 26. Each hollow spacer 26 forms a rectangular shaped frame-like structure as shown in FIG. 4 and extends around the sides of the door 10. As shown in FIG. 5, the hollow spacers 26 are preferably filled with desiccant 30 used as a drying agent. Any suitable material may be used as desiccant 30. Rubber or plastic such as neoprene or vinyl insulators 28 are used between the spacers 26 and the glass panels 14, 22 and 24 as shown in FIG. 5.

Four hollow pipe-like structures 34 are located between glass panels 14 and 24 as shown in FIG. 5, each of which extends along a different side of the refrigerator display door 10. See FIG. 4, which shows how one pipe-like structure 34 extends across the top side of the door 10 while another pipe-like structure 34 extends along the right side of the door 10. Similarly, separate structures 34 extend along the left side and bottom side of the door 10. The structures 34 are preferably made out of aluminum, but any suitable material may be used.

Referring again to FIG. 5, each pipe-like structure 34 has a flat portion 36 and flanged ends 37. Rubber or neoprene insulators 38 are used between flanges 37 of each pipe-like structure 34 and glass panels 14 and 24 as shown in FIG. 5. Note how end 39 of horizontal pipe-like structure 34 in FIG. 4 abuts up against flat portion 36 of vertical pipe-like structure 34.

As shown in FIGS. 4 and 5, sealant 32 is placed in the void space between the pipe-like structures 34 and the hollow spacers 26, and between each pipe-like structure 34 and glass panels 14 and 24. Sealant 32 bonds to structures 34, spacers 26, and glass panels 14, 22 and 24, positioning or holding panels 14, 22 and 24 in place. The preferred sealant 32 is polysulfide or polyurethane. However, any suitable thermal setting sealant may be used that hardens and bonds as described above.

The railless refrigerator display door 10 has a peripheral door frame 42 extending around the sides of the door 10. As such, frame 42 forms a generally rectangular-shaped frame. As shown in FIGS. 2, 3 and 5, frame 42 is in contact with or covers inside surface 44 of glass panel 24, but does not cover outside surface 46 of glass panel 14. As such, a more attractive or desirable railless refrigerator display door 10 results because only a small outside surface 48 of frame 42 appears at the front or outside of display door 10, or along the sides of structure 10. Note that the small outside surface of frame 42 may be curved if desired like surface 50 shown in FIG. 7.

Door frame 42 has a generally V-shaped cross-section with inside portion 47 and side portion 49. Portion 49 has a peripheral extension 52 extending peripherally around frame 42 which engages or snaps into elongated slots or openings 54 in the pipe-like structures 34 so that glass panels 14 and 24 are positioned with respect to frame 42 with peripheral edges 56 and 58 of panels 14 and 24, respectively, abutting up against portion 49 as shown in FIG. 5. As such, the railless refrigerator display door 10 is held together without mechanical fasteners such as nuts, bolts or screws.

Figure 6:
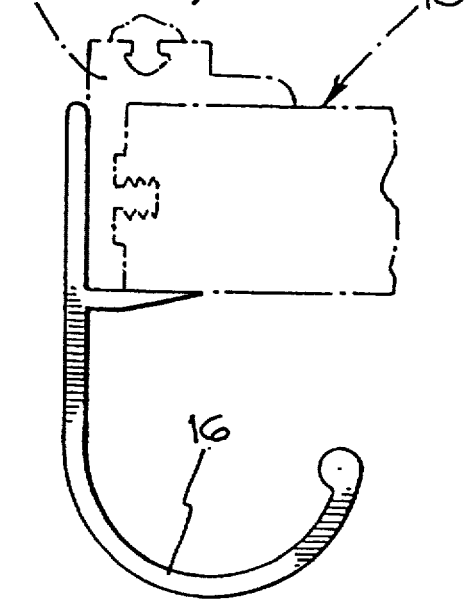
FIG. 6 is a detailed view taken in the direction of arrows 6—6 shown in FIG. 1 illustrating how a handle is attached to one of the railless refrigerator display doors (shown by dashed lines)

A handle 60 may be attached to the refrigerator display door 10 as shown in FIG. 6. In addition, as shown in FIGS. 2 through 4, door frame 42 has an aperture 62 at the upper right-hand corner thereof for hinge assembly 16, and an aperture 64 at the lower right-hand corner thereof for torque rod 18. It is important to note that handle 60 and apertures 62 and 64 may be positioned as desired to provide either a left- or right-hand door.

Referring again to FIG. 2, a door seal 66 with magnet 68 may be attached to the door frame 42 for the purpose of keeping the door 10 shut. As shown in FIG. 5, wires 40 may be positioned next to the pipe-like structures 34 and held in place by sealant 32.

Figure 7:
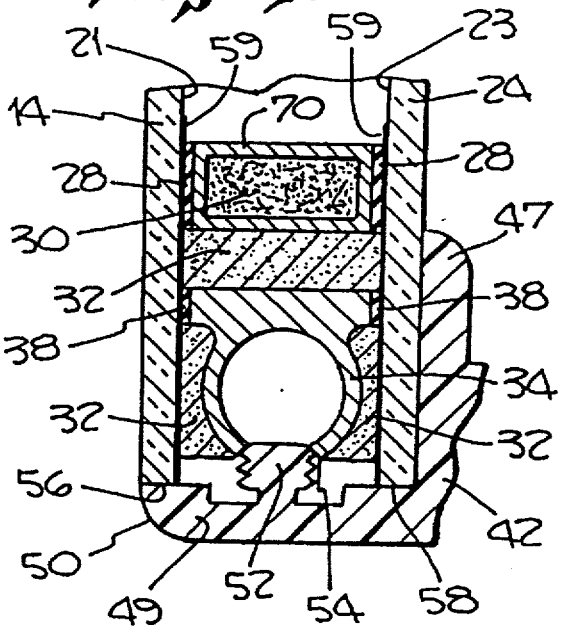
FIG. 7 is a detailed cross-sectional view taken like FIG. 5 showing another embodiment of the railless refrigerator display door using two glass panels.

Another embodiment of the railless refrigerator display door 10 is shown in FIG. 7. This embodiment uses only two glass panels 14 and 24 and a single peripheral hollow spacer 70 filled with desiccant 30. Note that sealant 32 is used to bond together panels 14 and 24, spacer 70 and pipe-like structures 34.

Preferably, as shown in FIGS. 1, 3, 5 and 7, borders 59 are painted (or otherwise coated) peripherally adjacent the edges 56 and 58 of glass panels 14 and 24 on surfaces 21 and 23, respectively. The painted borders 59 conceal from view structures 34 and spacers 26 or 70, providing a more attractive door 10.

Figure 8:
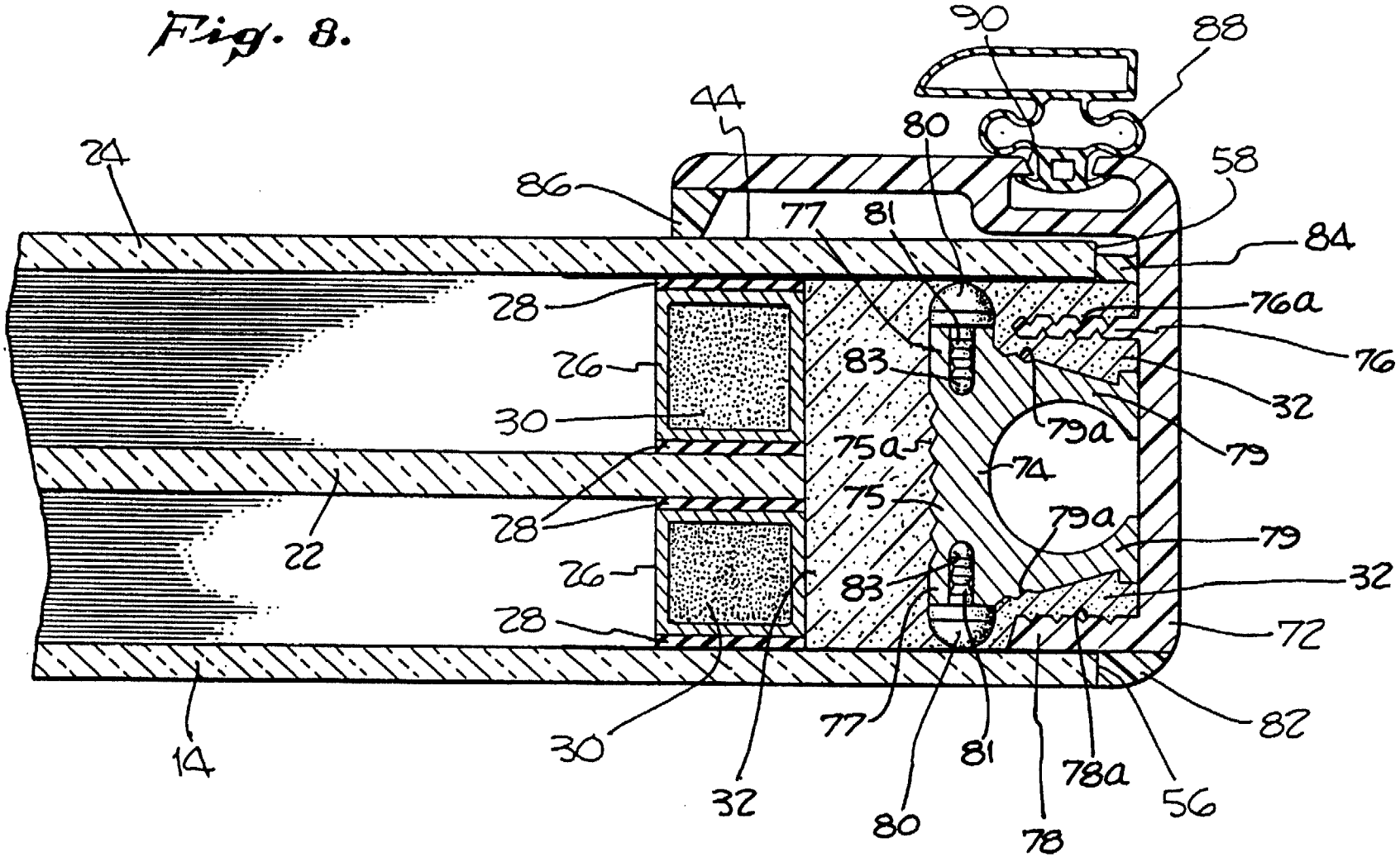
FIG. 8 is a detailed cross-sectional view taken like FIG. 5 showing still another embodiment of the railless refrigerator display door using three glass panels.

FIG. 8 shows still another embodiment of the railless refrigerator display door 10. This embodiment uses three glass panels 14, 22 and 24, two hollow spacers 26, preferably filled with dessicant 30, and insulators 28. However, only two panels 14 and 24 may be used, if desired, as shown in FIG. 7.

A different door frame 72 is used that has two peripheral extensions 76 and 78 *on an inwardly facing portion, which may as shown in FIG. 8, include undulating surfaces 76a and 78a, respectively*. Also, C-section structures 74 are used with this embodiment instead of the pipe-like structures 34 shown in FIGS. 5 and 7. Sealant 32 is used to bond together panels 14, 22 and 24, spacers 26, door frame 72 and the C-section structures 74. Note that extensions 76 and 78 of door frame 72 extend well into the sealant 32, helping to securely bond the frame 72 to the other parts of the embodiment. As such, this eliminates the need to use extensions 52 which snap into slots 54 as shown in FIGS. 5 and 7.

*As shown in FIG. 8, the C-section structures 74 include an inwardly facing portion 75 having a pair of side portions 77. The C-section structures 74 also include a pair of panel-facing convergent portions 79 which at least partly face an adjacent panel. The convergent portions define a generally cylindrical torque or hinge rod receiving portion therebetween. The inwardly facing portion 75 and the convergent portions 79 may include undulating surfaces 75a and 79a, respectively.*

The C-section structures 74 are preferably extrusions made out of metal such as aluminum. However, any other metal or suitable material may be used instead of aluminum like reinforced resin such as fiberglass, or the like. Also, structures 74 may be protrusions, or molded, cast, machined, or otherwise fabricated. Rubber or plastic such as neoprene or vinyl bumpers 80 are attached to *grooves 81 which are formed in* the C-section structures 74 *via each bumper's mounting portion, or extension 83*. The bumpers 80 preferably are elongated running the length of the structures 74. The bumpers 80 reduce heat transfer from inside panel 24 to outside panel 14, provide cushioning between the C-section structures 74 and the panels.

Door frames 42 and 72 may be made out of any suitable material such as metal, fiberglass, plastic, or the like. Preferably, material with a clear base resin, such as Keysor #1101-005 vinyl, sold by Keysor Corporation, is used for the door frames. Flexible extensions 82, 84 and 86 are thermally fused to door frame 72 using a dual durometer extrusion process and are used to cushion or seat the frame against peripheral edges 56 and 58 of panels 14 and 24, respectively, and inside surface 44 of panel 24. Preferably, a thermal plastic elastomeric material with a PVC Shore A 35–60 hardness is used for extensions 82, 84 and 86. However, any suitable plastic or other flexible (elastomeric) material may be used.

The above description discloses the preferred embodiments of the present invention. However, persons of ordinary skill in the art are capable of numerous modifications once taught these principles. Accordingly, it will be understood by those skilled in the art that changes in form and details may be made to the above-described embodiments without departing from the spirit and scope of the invention.

We claim:

1. A railless refrigerator display door comprising:

an outside glass panel and an inside glass panel;

a hollow spacer disposed between said glass panels, said spacer extending peripherally adjacent peripheral edges of said panels;

elongated structures disposed between said glass panels, said elongated structures extending peripherally adjacent said peripheral edges of said panels and peripherally about an outer periphery of said spacer;

a door frame extending peripherally about said elongated structures; and sealant disposed between said panels, said sealant holding together said panels, said spacer, said elongated structures, and said door frame, said door frame having elongated extensions extending inwardly into said sealant adjacent said elongate structures.

2. The display door of claim 1 wherein said structures have bumper means attached thereto for reducing heat cold transfer between said panels.

3. The display door of claim 1 wherein said door frame engages said peripheral edges of said panels and covers a peripheral inside surface of said inside panel.

4. The display door of claim 1 wherein said hollow spacer is filled with a desiccant.

5. The display door of claim 1 further comprising rubber insulators disposed between said spacer and said panels.

6. The display door of claim 1 wherein said sealant is a thermal setting sealant.

7. The display door of claim 1 wherein said bumper means are made out of rubber.

8. A refrigerator display door comprising:

an outside glass panel, a middle glass panel and an inside glass panel;

a spacer disposed between said outside and middle glass panels;

a spacer disposed between said middle and inside glass panels;

elongated structures disposed between said inside and outside panels and extending peripherally adjacent peripheral edges of said inside and outside panels and peripherally about outside peripheries of said spacers;

a door frame extending peripherally about said elongated structures; and sealant disposed between said inside and outside panels, said sealant holding together said spacers, said elongated structures, said inside, middle and outside panels, and said door frame, said door frame having elongated extensions extending inwardly into said sealant adjacent said elongated structures.

9. The display door of claim 8 wherein said door frame engages said peripheral edges of said inside and outside panels and covers a peripheral inside surface of said inside panel.

10. The display door of claim 8 wherein said hollow spacers are filled with a desiccant.

11. The display door of claim 8 further comprising rubber insulators disposed between said spacers and said panels.

12. The display door of claim 8 wherein said sealant is a thermal setting sealant.

13. The display door of claim 8 further comprising bumper means attached to said structures for reducing cold transfer between said inside and outside panels.

14. A refrigerator display door comprising:

an outside glass panel and an inside glass panel;

a spacer disposed between said glass panels, said spacer extending peripherally adjacent peripheral edges of said panels;

elongated structures disposed between said glass panels;

bumpers attached to each of said structures in order to reduce heat transfer between said inside and outside panels;

a door frame extending peripherally about said elongated structures; and sealant disposed between said panels, said sealant holding together said panels, spacer, elongated structures, and door frame, said door frame having elongated extensions extending inwardly into said sealant adjacent said elongated structures.

15. The display door of claim 14 wherein said door frame engages said peripheral edges of said panels and covers a peripheral inside surface of said inside panel.

16. The display door of claim 14 wherein said hollow spacer is filled with a desiccant.

17. The display door of claim 14 further comprising rubber insulators disposed between said spacer and said panels.

18. The display door of claim 14 wherein said sealant is a thermal setting sealant.

19. The display door of claim 14 further comprising flexible extension means for cushioning said door frame against said panels.

*20. A swing door assembly, comprising:*

*first and second door panels spaced apart to provide a space therebetween, said panels have panel edges;*

*a structural member positioned between said panels proximate said edges;*

*pads between the structural member and the panels such that the structural member extends less than the entire thickness of the space between the panels;*

*swinging means for mounting said panels for swinging movement;*

*wherein said structural member in transverse cross-section has a maximum dimension, the maximum dimension being less than the distance between said panels.*

*21. The assembly of claim 20 wherein said structural member includes side portions facing respective adjacent said panels and convergent portions converging towards one another.*

*22. The assembly of claim 20 wherein the pads are resilient plastic pads having a low thermal conductivity.*

*23. The assembly of claim 22 wherein the pads are neoprene.*

*24. The assembly of claim 22 wherein the pads are vinyl.*

*25. The assembly of claim 20 wherein the structural frame member has a maximum outer cross-sectional dimension and the dimension is less than the distance between the panels.*

*26. The assembly of claim 20 further comprising sealant between said panels.*

*27. The assembly of claim 20 wherein the structural member comprises a holding member and said swinging means includes a torque rod disposed in said holding member.*

*28. The assembly of claim 20 wherein said pads include bumpers attached directly to side portions of said structural member, said side portions extending a first distance in a direction parallel to said panels, and convergent portions which extend a second distance in a direction parallel to the panels, said second distance being greater than said first distance.*

*29. The assembly of claim 20 wherein said structural member has a maximum cross- sectional distance and the maximum cross-sectional distance is less than the distance between said panels.*

*30. The assembly of claim 29 wherein the maximum cross-sectional distance is on a cross-section diagonal.*

*31. The assembly of claim 20 wherein said structural member has an inwardly facing portion and a rod receiving portion secured thereto.*

*32. The assembly of claim 20 further comprising a third panel thereto disposed between said first and second panels, a first spacer spacing said first and third panels apart, and a second spacer spacing said second and third panels apart.*

*33. The assembly of claim 20 further comprising a door frame having a peripheral extension which secures said door frame to said door.*

*34. The assembly of claim 20 further comprising sealant between said structural member and one panel.*

*35. A door assembly for use as a swing door, the assembly comprising:*

*at least two door panels having edges and being spaced apart to provide an air space between the panels;*

'an elongate structural member positioned at least partly between the panels near the respective edges of at least one side of the panels, the structural member having side portions facing a respective adjacent panel;

'bumpers composed of a resilient material secured to each side portion of the structural member, the bumpers having a thickness between the structural member and the panel and a width perpendicular to the thickness, wherein the thickness is approximately equal to the width; and 'swing elements positioned with respect to the structural member so as to permit swinging movement of the door.

*36. The assembly of claim 35 wherein the structural member includes a groove and wherein the bumpers elements engage the groove in the structural member.*

*37. The assembly of claim 35 wherein said bumpers have rounded tip surface.*

*38. The assembly of claim 35 wherein said bumpers extend into said structural member a distance as great as the distance said structural member is spaced from one of said panels.*

*39. The assembly of claim 35 wherein said structural member includes an outermost edge adjacent but separate from one of said panels and wherein at least one of said bumpers which covers said outermost edge.*

*40. The assembly of claim 35 wherein said bumpers interengage each said side portion of the structural member and are positioned at least partly between said structural member and a respective panel.*

*41. The assembly of claim 35 wherein said bumpers include mounting portions which extend into said structural member.*

*42. The assembly of claim 35 wherein said structural member includes a groove, said bumpers include an extension, and said extension extends into said groove.*

*43. The assembly of claim 35 wherein said bumpers are formed with a semi-circular cross-section.*

*44. A swing door assembly, comprising:*

*first and second door panels having door panel edges, said door panels being spaced apart to provide a space therebetween;*

*a structural member positioned at least partly between said panels proximate the respective said edges of at least one side of said panels;*

*plastic pads between said structural member and said panels;*

*wherein said structural member has side portions facing a respective adjacent said panel and converging portions converging toward each other and away from said respective adjacent panels such that twisting of said structural member between said panels does not result in said structural member contacting either of said panels; and*

*at least one swing element positioned coaxially with respect to said structural member and permitting swinging movement of said panels.*

*45. The assembly of claim 51 wherein said plastic pads comprise bumpers attached to said side portions and said converging portions are longer than said side portions.*

*46. The assembly of claim 44 wherein said structural member has a maximum cross- sectional dimension and said panels are spaced apart a distance greater than the maximum cross- sectional dimension such that said structural member when twisted remains spaced from both said panels.*

*47. The assembly of claim 44 further comprising sealant between said panels.*

*48. The assembly of claim 54 wherein one portion of said sealant is between said first panel and said structural member and another portion of said sealant is between said second panel and said structural member.*

*49. A swing door assembly, comprising:*

*first and second door panels spaced apart to provide a space therebetween, said panels having panel edges;*

*a structural member positioned between said panels proximate said edges;*

*elastic members disposed between said panels and said structural member and spacing said structural member from both said panels; and*

*swinging means for mounting said panels for swinging movement;*

*wherein said structural member in transverse cross-section has a maximum dimension, the maximum dimension being less than the distance between said panels such that said structural member is twisted about its longitudinal axis impacts neither of said panels.*

*50. The assembly of claim 49 wherein said structural member comprises a holding member and said swinging means includes a torque rod disposed in said holding member.*

*51. The assembly of claim 49 wherein said structural member includes side portions facing respective adjacent said panels and said portions converging towards one another relative to said panel edges in an outboard direction.*

*52. The assembly of claim 49 further comprising at least one spacer disposed inboard of said structural member and between said panels so as to space said panels apart.*

*53. The assembly of claim 49 wherein said structural member has an inwardly facing portion and a rod receiving portion secured thereto.*

*54. The assembly of claim 49 wherein said structural member includes an inwardly facing portion having a first side facing said first panel and a second side facing said second panel, said elastic members include first and second bumpers, said first bumper extends into said first side and engages said first panel, said second bumper extends into said second side and engages said second panel, and said first and second bumpers reduce torsional stresses exerted on said panels from said structural member.*

*55. The assembly of claim 49 further comprising sealant between said panels.*

*56. The assembly of claim 49 wherein said structural member has an inwardly facing portion generally perpendicular to said panels, said inwardly facing portion having an undulating surface associated therewith interengaging said sealant.*

*57. The assembly of claim 49 wherein said structural member has a first undulating surface which said sealant interengages and a second undulating surface which said sealant interengages.*

*58. The assembly of claim 49 wherein said structural member includes a first groove facing said first panel and a second groove facing said second panel, and said elastic members include a first bumper secured in said first groove and contacting said first panel and a second bumper secured in said second groove and contacting said second panel.*

*59. The assembly of claim 49 further comprising a third panel disposed between said first and second panels, a first spacer spacing said first and third panels apart, and a second spacer spacing said second and third panels apart.*

*60. The assembly of claim 49 further comprising a door frame with a portion positioned at said panel edges, said door frame having a peripheral extension which secures said door frame to said door.*

*61. The assembly of claim 60 further comprising sealant between said structural member and one panel and said extension.*

*62. The assembly of claim 49 wherein said structural member has a slot and an extension which extends into said slot.*

*63. The assembly of claim 49 wherein said elastic members are made of rubber.*

*64. The assembly of claim 49 wherein said elastic members are made of plastic.*

* * * * *